UNITED STATES PATENT OFFICE.

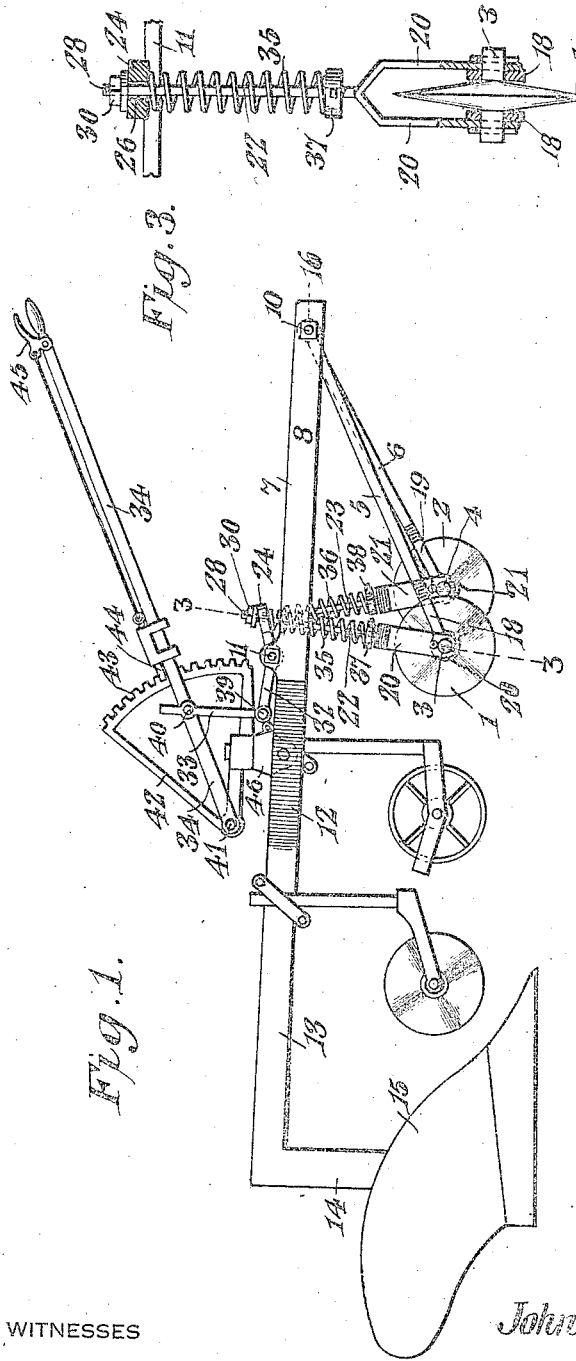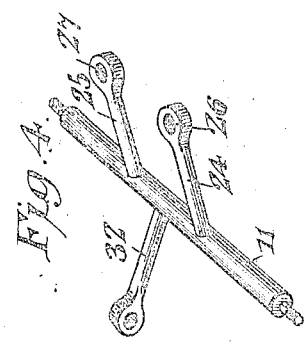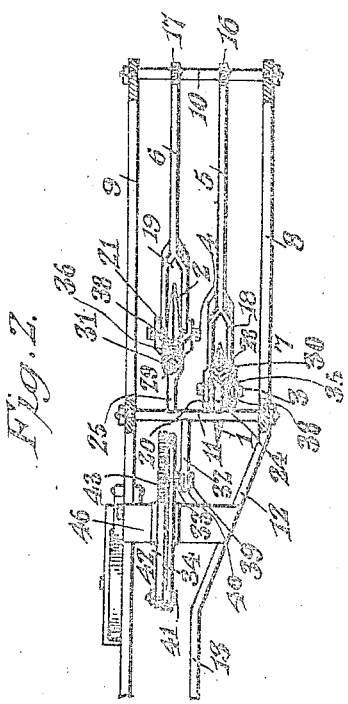

JOHN HEITBRINK, OF MINSTER, OHIO.

COLTER ATTACHMENT FOR GANG-PLOWS.

1,136,525.

Specification of Letters Patent.  Patented Apr. 20, 1915.

Application filed July 6, 1914. Serial No. 849,198.

*To all whom it may concern:*

Be it known that I, JOHN HEITBRINK, a citizen of the United States, residing at Minster, in the county of Auglaize and State of Ohio, have invented a new and useful Colter Attachment for Gang-Plows, of which the following is a specification.

The invention relates to improvements in colter attachments.

The object of the present invention is to improve the construction of colter attachments and to provide a simple, practical, and efficient colter attachment, designed for use on gang plows and adapted to be readily applied to the same, and capable of cutting the soil at spaced points in advance of a plow, whereby less power and labor will be required to operate the plow.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing: Figure 1 is a side elevation of a plow equipped with a colter attachment constructed in accordance with this invention. Fig. 2 is a plan view of the front portion of the plow. Fig. 3 is a detail transverse sectional view taken substantially on the line 3—3 of Fig. 1. Fig. 4 is a detail perspective view of the rock shaft.

Like numerals of reference designate corresponding parts in all the figures of the drawing.

In the accompanying drawing, in which is illustrated the preferred embodiment of the invention, the colter attachment, which is designed to be applied to each of the plow units of a gang plow, comprises in its construction a pair of rolling colters 1 and 2, spaced apart laterally, preferably four or five inches, and arranged in different transverse planes, as shown. The rolling colters 1 and 2, which consist of disks, are mounted on transverse shafts or axles 3 and 4 and connected by the same with the lower ends of longitudinally disposed links 5 and 6, extending downwardly and rearwardly from the front portion of a plow beam 7 or beam frame. The plow beam or beam frame, which may be of any desired construction, is shown in the accompanying drawing as consisting of side bars 8 and 9 connected at their front portions by a transverse rod 10 and by a transverse rock shaft 11 located at a point intermediate of the ends of the side bars 8 and 9 and suitably journaled thereon. The side bar 8 is provided with an intermediate angularly disposed portion 12 extending inwardly and rearwardly to the rear portion 13 of the side bar 8, whereby the rear portions of the side bars are arranged closer together than the front portions of the same. The rear portions of the side bars extend downwardly to form a standard 14, to which is secured a plow proper 15, which may be of any preferred construction.

The front transverse rod, which is suitably secured at its terminals to the front ends of the side bars 8 and 9, constitutes a pivot for the inclined links 5 and 6 and pass through the front ends 16 and 17 of the same. The links, which are of unequal length to arrange the colters 3 and 4 in different transverse planes, have their rear ends 18 and 19 forked or bifurcated and provided with transversely alined openings to receive the transversely disposed shafts or axles 3 and 4, which also pass through alined openings in the forked or bifurcated lower ends 20 and 21 of rods 22 and 23. The rods 22 and 23 extend upwardly from the shafts or axles of the colters, and are slidably connected with spaced arms 24 and 25, which extend forwardly from the rock shaft 11. The arms 24 and 25 are provided in their front ends with openings 26 and 27 to receive the rods 22 and 23, and the latter have threaded upper terminals 28 and 29 for the reception of nuts 30 and 31, washers being preferably interposed between the nuts and the arms. The rock shaft is also provided with a rearwardly extending arm 32 which is connected by a link 33 with an adjusting lever 34, adapted to be operated to raise and lower the colters 1 and 2 to arrange the same for cutting the desired depth and also to elevate them above the surface of the ground when desired.

The colters are yieldably maintained in engagement with the soil by coiled springs 35 and 36, disposed on the rods 22 and 23 and interposed between adjustable lower set collars 37 and 38, and the arms 24 and 25. The adjustable set collars, which are mounted on the lower portions of the rods, are adapted to be raised or lowered to vary the tension of the coiled springs 35 and 36. When the adjusting lever is operated to lower the colters, the forwardly extending arms of the rock shaft engage the upper ends of the coiled springs and exert a downward pressure thereon in forcing the colters into the ground, and the said springs are adapted to yield to prevent breakage of the colters, should the same come in contact with a stone or other hard substance. The independent pivotal mounting of the colters and the slidable connection between the rods thereof and the forwardly extending arms of the rock shaft permit either of the colters to move upwardly against the action of its spring, independently of the other colter, and the spring will return the colter to its normal position with relation to the plow beam after it has passed over an obstruction.

The link 33 is pivoted at its lower end 39 to the rearwardly extending arm 32 of the rock shaft, and it is connected at its upper portion by a suitable pivot 40 to the adjusting lever. The adjusting lever, which is disposed longitudinally of the plow unit, is pivoted at its rear end 41 to a bracket 42, consisting of a substantially sector-shaped body portion disposed longitudinally of the plow unit and having a notched segment 43 at its front portion. The notched segment is engaged by a pawl or detent 44, carried by the adjusting lever and operated by a latch lever 45. The bracket is provided with a transversely disposed base 46, extending across the space between the side bars 8 and 9 and suitably secured to the frame. As the specific construction of the bracket for mounting the notched segment on the supporting frame does not constitute a portion of the present invention, the said segment may be mounted in any desired manner.

What is claimed is:—

1. A colter attachment of the class described including independently movable links pivoted at their front ends and having forked rear portions, colters mounted in the forked portions of the links, rods having forked portions straddling the colters and connected with the links, a rock shaft provided with arms connected with the upper ends of the rods, and means for partially rotating the rock shaft.

2. The combination with a beam having spaced side bars, a front pivot connecting the side bars, a transverse rock shaft also connecting the said side bars and arranged in rear of the pivot, said rock shaft being provided with spaced forwardly extending arms and having a rearwardly projecting arm, inclined links hung from the pivot and extending downwardly and rearwardly therefrom, colters carried by the rear ends of the links, rods connected with the links and with the front arms of the rock shaft, a bracket mounted on the beam in rear of the rock shaft and having a notched segment, and an adjusting lever fulcrumed on the bracket and connected with the rear arm of the rock shaft.

In testimony that I claim the foregoing as my own, I have hereto affixed my signature in the presence of two witnesses.

JOHN HEITBRINK.

Witnesses:
   FRANK OLBERDING,
   B. H. NAGEL.